3,836,676
FEEDSTUFF FOR FOWL, FISH AND DOMESTIC
ANIMALS
Chukei Komakine, 6–1, 3-chome, Taira Aza,
Iwaki, Japan
No Drawing. Original application June 29, 1971, Ser. No.
158,077, now Patent No. 3,776,188. Divided and this
application Jan. 4, 1973, Ser. No. 320,956
Int. Cl. A23k 1/175
U.S. Cl. 426—74                    4 Claims

ABSTRACT OF THE DISCLOSURE

An odorless composition useful as a feedstuff for fowl, fish and domestic animals consisting essentially of a dried mixture of droppings from fowl, coarse powder crystalline ferrous sulfate heptahydrate, and a finely powdered adsorbent selected from the group consisting of fly ash and zeolite, and containing about 7% by weight of said ferrous sulfate heptahydrate and about 3.5% by weight of said adsorbent, said percentage by weight being based on the weight of the droppings.

---

This application is a divisional application of Ser. No. 158,077 filed June 29, 1971, now U.S. Pat. No. 3,776,188.

BACKGROUND OF THE INVENTION

This invention relates to the poultry farming, and more particularly to a method of inhibiting generation of offensive odor in poultry farms.

As the demand for chicken and egg as foodstuffs has remarkably expanded, the chicken farming enterprise is now transforming itself from the home industry to a kind of large scale manufactory industry in which scores of several ten thousands of chickens are raised. However, such a large scale poultry raising is inevitably attended by the most difficult problem of how to deal with the droppings. The semi-fluid droppings excreted day and night all over the floor of vast chicken houses offer a hotbed for maggots and pathogenic germs, and stench emitted from the droppings discourages farm workers and reduces egg-laying rate. In fact, it is an established fact that more than 50% of the hens which are raised in a large scale chicken house are suffering from some kind of respiratory disease caused by noxious gases such as ammonia and hydrogen sulfide reeking in chicken houses, and thus their egg-laying rate is about 30% less than that of healthy hens. Besides, it is well known that the offensive odor of chicken houses drifts to the surrounding neighborhood as far as half kilometer and creates an environmental pollution or nuisance to the people dwelling in the neighborhood.

SUMMARY OF THE INVENTION

An object of the present invention is to substantially eliminate generation of offensive odor from poultry farms.

Another object of the present invention is to increase the egg-laying rate in large scale poultry farms.

Still another object of the present invention is to produce an odorless organic fertilizer rich in highly effective components from fowl droppings.

Further, still another object of the present invention is to produce a feedstuff suitable for raising fowl, fish and domestic animals from fowl droppings.

These objects may be attained in accordance with the present invention by dusting coarse powder of ferrous sulfate hepta-hydrate as a deodorizer over the floor of chicken houses. The ferrous sulfate hepta-hydrate powder is preferably used in the form of a mixture with fine powder of fly ash or zeolite for convenience in dusting. It is preferably dusted in advance so that chickens may drop their excrement on the layer of the scattered ferrous sulfate powder, and after a period of time the heap containing droppings, ferrous sulfate powder and the additive material is collected and taken out of chicken houses. The same operation is repeated in succession.

The collected mixture, after being dried, can be effectively utilized as an odorless organic fertilizer or an odorless feedstuff suitable for raising fowl, fish and domestic animals.

It will be understood that various modification may be made without departing from the spirit or scope of the invention herein described, and it is intended in the appended claims to cover all such modifications as falling within the true spirit and scope of the invention.

DETAILED DESCRIPTION OF THE INVENTION

Although this invention relates to the farming of fowl such as chicken, turkey or duck in its broad aspect, the invention is hereinafter illustrated specifically with respect to the chicken farming as the typical embodiment thereof.

Chicken droppings undergo zymosis and decomposition within a few hours after excreted and emit stench. In order to kill this stench, a method of dusting an adsorbent such as zeolite powder over the floor of chicken houses was considered. However, such an adsorbent is expensive and is not so effective. Furthermore, such an adsorbent merely adsorbs malodor emitted from the droppings, and therefore, in order to effect radical deodorization, generation of malodor per se must be inhibited. In other words, the zymotic decomposition of the droppings must be ceased.

I have thought of using industrial ferrous sulfate, which is known to have a weak sterilizing activity, for the purpose of the radical deodorization of the chicken droppings. The industrial ferrous sulfate, that is, crude crystalline ferrous sulfate hepta-hydrate ($FeSO_4 \cdot 7H_2O$), is produced in quantities as a by-product in various inorganic chemical industries, especially in the manufacture of titanium oxide from ilmenite. A small portion thereof is used as the material for production of red iron oxide, some kinds of inks and pigments, as a mordant, but major portion thereof is discarded as an industrial waste without any economic use. Unfortunately ferrous sulfate is strongly acidic, and this material cannot be dumped at places where there is fear for provoking public nuisance problems. Therefore, today in the titanium oxide plants, as a means for disposing the ferrous sulfate waste, aqueous solution of the ferrous sulfate is neutralized with ammonia to be converted to costly ammonium sulfate and iron hydroxide. This is a desperate means with which the manufacturer resigns himself to a deficit operation.

The present inventor dusted the floor of a chicken house with a coarse powder (10–50 Tyler mesh) of the above-mentioned by-product ferrous sulfate, and raised many chickens there. It was found that the chicken droppings mixed with the ferrous sulfate no longer undergo zymosis and decomposition and therefore emit almost no malodor, and that fertilizing activity of the droppings is not lost.

Now the invention is explained with respect to a specific embodiment. About 300 kg. of the ferrous sulfate was dusted on the floor of a chicken house and 10,000 hens were raised there. After 5 days, about 400 kg. of the additional ferrous sulfate was scattered over the accumulated droppings on the floor, and feeding was continued 5 more days. During these ten days, no offensive odor was noticed in the chicken house, and it was found that the egg-laying rate increased by about 15% in comparison with that when ferrous sulfate was not used. After these ten days, about 7,000 kg. of the raw droppings mixed with ferrous sulfate was collected. The ferrous sulfate content in the raw droppings was about 10%. The droppings, which contained about 70% of water, were dried at a temperature of from 120 to 160° C., and about 225 kg. of an odorless organic fertilizer containing about 8% water was obtained. The analysis of the fertilizer was: N 4.57%, $P_2O_5$ 4.48%, $K_2O$ 2.43% and $Fe_2O_3$ 3.68%. The analysis of the fertilizer containing 8% water obtained from the same droppings excepting no use of ferrous sulfate was: N 2.84%, $P_2O_5$ 4.12%, $K_2O$ 2.52% and $Fe_2O_3$ 1.32%, and the yield of this fertilizer was about 200 kg.

As the industrial ferrous sulfate hepta-hydrate is somewhat hygroscopic, crushing and dusting of this material cannot be easily carried out. Also when this material is let stand in the atmosphere, the surface of the crystals of the material is gradually converted yellowish brown iron hydroxysulfate, and thus the above-mentioned deodorizing effect is weakened. It was found that inconvenience in handling and instability of this material is remedied by adding fly ash or finely pulverized zeolite powder thereto. That is to say, a composition, which is obtained by mixing coarse powder of the industrial crystalline ferrous sulfate hepta-hydrate with about a half amount of fly ash or fine powder (100–150 Tyler mesh) of dried zeolite, followed by drying at a temperature 60–80° C., is non-hygroscopic and stable against decomposition. As the particles thereof are self-lubricated, it is satisfactory in efficacy and convenient in handling when used as the deodorizer for the chicken droppings. The ferrous sulfate in this composition does not decompose, and so the amount thereof to be dusted over the floor will be less than 700 kg. per 10,000 hens per ten days, which is the same amount as in the previously mentioned case.

Raw chicken droppings contain about 75% water, and its pH value is around 7. Crystalline ferrous sulfate hepta-hydrate contains about 45% water in its molecule, and the pH of its high concentration aqueous solution is about 2.2. In contrast, fly ash, which is an ultrafine ash powder collected from smoke in the flue of boilers burning powdered coal by means of the dust collector, is an alkaline material. An aqueous dispersion prepared by suspending 30 g. of this material in 60 ml. of water shows a pH value of about 11. Therefore, the chicken droppings mixed with about 7% by weight (on the basis of the weight of the droppings) of the ferrous sulfate hepta-hydrate powder and about 3.5% by weight (the same as above) of fly ash exhibits pH of around 7.3, which means that the mixture is substantially neutral. Furthermore the particles of fly ash are spherical and act as a lubricant, which makes the operation of pelletizing the dried droppings mixture quite easy. For the above-mentioned reasons, as the additive for the ferrous sulfate, fly ash is preferred rather than zeolite. However, supply of fly ash is getting more and more scarce, since consumption of coal as the fuel is becoming more and more unpopular. In this situation, zeolite can be used instead of fly ash. Zeolite, as well as fly ash, is known as an adsorbent, and it acts as the adsorbent for adhesion moisture of ferrous sulfate crystals in the present invention, too.

The crystalline ferrous sulfate hepta-hydrate is easily converted to iron hydroxysulfate when it is heated at 120° C. in dry air.

The substance obtained by drying a mixture of 100 parts by weight of raw chicken droppings, about 7 parts by weight of crystalline ferrous sulfate hepta-hydrate and about 3.5 parts by weight of fly ash or fine zeolite powder can be utilized effectively as an odorless fertilizer for plants. Furthermore, it has been found by the present inventor that the substance can be used as an odorless feedstuff for domestic animals.

All animals will never eat raw chicken droppings because of its offensive odor and because they instinctively know that they are an unsanitary material. But fish, fowl and domestic animals are quite willing to eat the odorless chicken droppings obtained by the above explained treatment, and it is most surprising that even chickens themselves eat them again. The chicken droppings mixture obtained in accordance with this invention is highly nutritive.

It is generally said that a feedstuff is satisfactory if it contains more than 18% of proteins. However, the dried chicken droppings of this invention contain about 30% of proteins. An example of the analysis of dried chicken droppings is given below:

| | | |
|---|---|---|
| Water | Percent | 10.35 |
| Proteins | do | 21.90 |
| Fats | do | 1.25 |
| Fibrous substances | do | 7.13 |
| Ash | do | 30.04 |
| Soluble substances containing no N | do | 21.33 |
| Calorific value | cal./kg. | 2,161 |
| Lysine | percent | 0.36 |
| Methionine | mg., percent | 47.2 |
| Triptophane | do | 83.2 |

The protein content of the chicken droppings feedstuff of this invention, which contains ferrous sulfate and fly ash or zeolite powder, is generally 22%–23%.

The intestinal canal of bird is very short so as to keep its bodyweight very light for the ease of flying. Therefore, ingested food is excreted without being completely digested and absorbed, and so droppings of chickens, or birds in general, contains high concentration of proteins. However, raw droppings cannot be used as feedstuff as it is, because they are an unsanitary material which is subject to generation of malodor, maggots and pathogenic germs as mentioned before. But the droppings which have been treated with ferrous sulfate in accordance with this invention are odorless and quite free from such pestilential factors, and thus are acceptable by animals.

The chicken droppings substance obtained in accordance with this invention contains iron hydroxysulfate and fly ash or zeolite. It is already established that these added materials are harmless if they are intaken in animal bodies together with the feed. However, it is desirable to add less than about 20% of the chicken droppings feedstuff to ordinary feed, since there is possibility of causing stomach disorders if too a large amount thereof is ingested.

Carp were raised with this droppings feedstuff alone for six months. There was no hindrance in their growth, and there occurred no putrefaction of sludge accumulated on the bottom of pond as experienced when conventional feedstuffs were used.

Pigs were raised with an ordinary feedstuff containing 20% by weight of this chicken droppings feedstuff, and the pigs willingly ate the mixed feedstuff and grew satisfactorily. Consequently, excellent pork rich in protein and containing less fat was produced in the same yield as with the conventional feed. In addition thereto, the offensive odor of the pig farm was greatly reduced, and a better environment was created.

Further, in chicken raising, an ordinary feedstuff containing 20% by weight of this chicken droppings feedstuff was used. Chickens were raised on the floor dusted with the ferrous sulfate-fly ash mixture perpetually. The results were no less than those in the case where chickens were raised with ordinary feed. The surplus of the treated droppings were appropriated to pig raising.

It will require no explanation that cattle, horse or any other animal can be fed with this chicken droppings feedstuff as well as pig.

To utilize chicken excrements for feeding various kinds of animal is a surprising innovation which brings remarkable economic gains.

What is claimed is:

1. An odorless feedstuff for fowl, fish and domestic animals consisting essentially of a dried mixture of droppings from fowl, coarse powder of crystalline ferrous sulfate hepta-hydrate and a finely powdered adsorbent selected from the group consisting of fly ash and zeolite and containing about 7% by weight of said ferrous sulfate and about 3.5% by weight of said adsorbent, said percentage being based on the weight of said droppings.

2. The odorless feedstuff according to Claim 1 wherein said coarse powder ferrous sulfate has a particle size of between 10 and 50 Tyler mesh, and wherein said adsorbent has a particle size of between 100 and 150 Tyler mesh.

3. The odorless feedstuff according to Claim 2 wherein said adsorbent is fly ash.

4. The odorless feedstuff of Claim 2 wherein said adsorbent is zeolite.

References Cited

UNITED STATES PATENTS

| | | | |
|---|---|---|---|
| 66,357 | 7/1867 | Kenny | 71—21 |
| 3,657,423 | 4/1972 | Yacowitz | 99—4 |
| 2,477,892 | 8/1949 | Paquette | 119—1 |
| 289,858 | 12/1883 | Rice | 424—145 |
| 3,404,987 | 10/1968 | Kooistra et al. | 424—131 |
| 3,030,222 | 4/1962 | Eichenlaub | 264—80 |

NORMAN YUDKOFF, Primary Examiner

C. P. RIBANDO, Assistant Examiner

U.S. Cl. X.R.

426—335, 805, 807, 486; 71—21, 64 G; 252—184